United States Patent [19]

Averill

[11] Patent Number: 5,313,591

[45] Date of Patent: May 17, 1994

[54] COMPUTER BUS ARBITRATION FOR N PROCESSORS REQUIRING ONLY N UNIDIRECTIONAL SIGNAL LEADS

[75] Inventor: Gregory S. Averill, Ft. Collins, Colo.

[73] Assignee: Hewlett-Packard Company, Palo Alto, Calif.

[21] Appl. No.: 904,118

[22] Filed: Jun. 25, 1992

[51] Int. Cl.⁵ ............................................ G06F 13/368
[52] U.S. Cl. ............................ 395/325; 364/242.92; 364/DIG. 1; 364/937.01; 364/DIG. 2
[58] Field of Search .................. 395/325, 725, 275; 364/242.92, DIG. 1, 937.01, 935.41, DIG. 2

[56] References Cited

U.S. PATENT DOCUMENTS

| | | | |
|---|---|---|---|
| 4,920,486 | 4/1990 | Nielsen | 395/325 |
| 5,191,649 | 3/1993 | Cadambi et al. | 395/200 |
| 5,195,185 | 3/1993 | Marenin | 395/325 |

Primary Examiner—Michael R. Fleming
Assistant Examiner—Glenn A. Auve
Attorney, Agent, or Firm—Augustus W. Winfield

[57] ABSTRACT

A system and method for using N unidirectional lines to implement signals for arbitration, variable length transactions, automatic responses, and efficient burst transaction modes for a bus in a cache-coherent multi-processor computer system having N processors. Processors use arbitration lines to implement busy signals for variable length transactions. A processor needing to respond to a transaction is granted automatic access to a bus if it is the last processor asserting a busy signal. A processor in a burst transaction mode is granted automatic continuous access without arbitration if no other processors request access. The use of only N lines minimizes pin-out for an integrated processor. The use of unidirectional (one driver, N−1 receivers) lines further optimizes cost and speed.

8 Claims, 10 Drawing Sheets

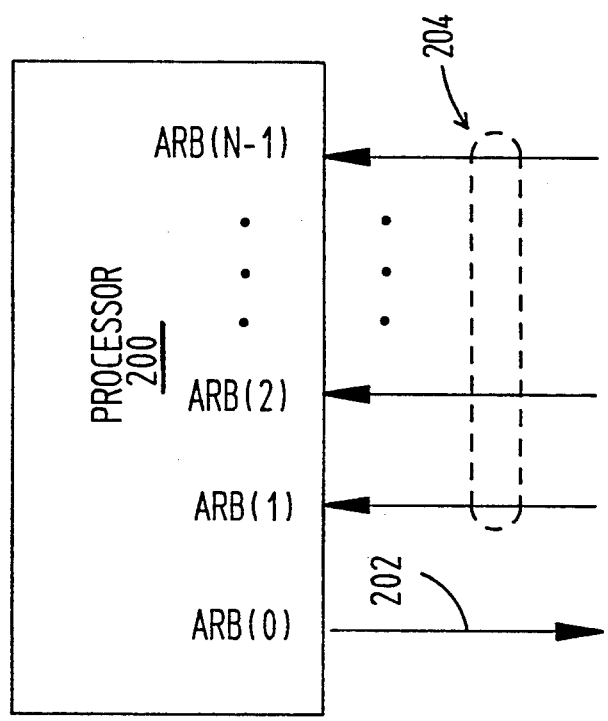

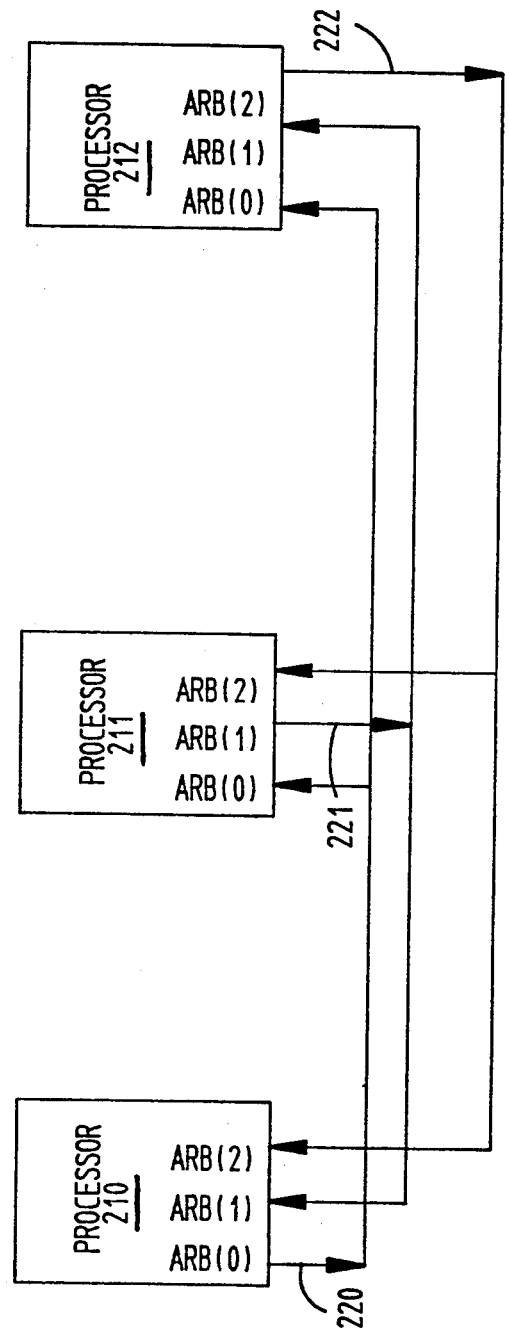

COMPUTER BUS ARBITRATION FOR N PROCESSORS REQUIRING ONLY N UNIDIRECTIONAL SIGNAL LEADS

FIELD OF INVENTION

The present invention relates generally to computer systems and more particularly to improving speed and cost of computer bus arbitration in a multiprocessor system.

BACKGROUND OF THE INVENTION

Modern computer systems often have a plurality of processors interconnected by a shared bus. The shared bus is used for processor to processor communication and for communication between processors and memory or peripheral devices. Typically, at any one time, only one processor can have control of the shared bus. Typically, there is an arbitration method, called an arbitration protocol, for determining which processor gains control of the shared bus when multiple processors simultaneously contend for control.

Processors in a multiprocessor system may have local cache memory for fast access to information. The information in each processor's cache must be accurate and current. This is called cache coherency. A shared-memory cache-coherent multiprocessor system has multiple processors, each with local cache memory and a system for maintaining coherency of each local cache. In a shared-memory cache-coherent multiprocessor system, if any processor changes data in its cache, subsequent accesses of the same data by other processors must reflect the change. Therefore, the change must propagate to all other caches in the system. When a processor gains control of the bus, other processors may not need to do anything, or other processors may have to flush or purge and later refill cache memory. The flush or purge must be accomplished for each cache in all processors in the system before the original transaction can be considered complete. Therefore, in general, transactions which affect cache memory require a variable amount of time.

In general, computer bus designs and arbitration protocols need to accommodate variable length transactions and responses, efficient bursts of transactions, and bounded waiting. One example of a variable length transaction is cache memory updating as described above. Another example is a request for data from shared memory. If the memory device is slow, the memory device might assert a "busy" signal to hold off arbitration requests by other processors.

Alternatively, the system might provide for split transactions in which a first device arbitrates for control of the bus, sends a request to a second device and then releases control immediately. Then at some later time, the second device arbitrates for control of the bus to provide the response. However, a second arbitration is inefficient. The bus design needs to automatically accommodate access by a responding device without requiring a second arbitration. In particular, in a shared-memory cache-coherent multiprocessor system, there will typically be at most one processor that needs to respond to another processor's transaction. That response needs to be automatic without requiring a second arbitration.

Some transactions naturally occur in bursts. For example, in a data base application, a request for a record might require retrieval of multiple sequential fields of data. A computer bus design and arbitration protocol needs to accommodate burst transactions by minimizing the time and overhead involved in allowing a device which has control of the bus to temporarily keep control of the bus. However, this goal must be balanced against a need to provide bounded wait time (eventual access) to all devices, regardless of priority.

In the computer industry, there is an ongoing need to make computer systems smaller, faster, and lower cost. In general, computer systems are being consolidated into a relatively few large scale integrated circuits. A significant factor in the size, speed and cost of an integrated circuit is the number of external connections to the integrated circuit. A computer bus typically comprises many signal conductors, most of which need to attach directly to devices on the bus. Prior art shared-memory cache-coherent multiprocessor systems are typically large and expensive with separate bus electronics. Therefore, prior art systems have not had a high design priority to minimize signal lines. However, as more of the bus electronics are integrated within processors, there is a need to minimize the number of bus signal conductors to minimize size and cost of attached integrated processors.

Multiple signals can be encoded on a single conductor. However, in general, this reduces speed because of encoding/decoding time. In general, for speed considerations, conductor minimization needs to be done by methods other than encoding.

Conductors can also be made bidirectional, with multiple drivers and receivers. This reduces speed due to impedance and transmission line considerations. In general, a unidirectional signal conductor with a single signal source can be made faster than an equivalent cost bidirectional system or it can be made at lower cost than a bidirectional system with equivalent speed.

SUMMARY OF THE INVENTION

The present invention improves computer bus arbitration design by providing a fair arbitration protocol, efficient accommodation of variable length transactions and burst transactions, and automatic bus access by a responding processor, with only N unidirectional signal conductors for N processors. The arbitration electronics are integrated within processor electronics. Minimizing the number of signal conductors for arbitration improves the cost and size of the processor integrated circuits. Making the arbitration signal conductors unidirectional improves the cost and speed of the arbitration system.

BRIEF DESCRIPTION OF THE DRAWINGS

FIG. 2A is a block diagram illustrating additional detail for arbitration bus signal lines for one processor.

FIG. 2B is a block diagram illustrating the detail of FIG. 2A in an example arbitration bus with three processors.

DETAILED DESCRIPTION OF THE PREFERRED EMBODIMENT OF THE INVENTION

Figure 1:
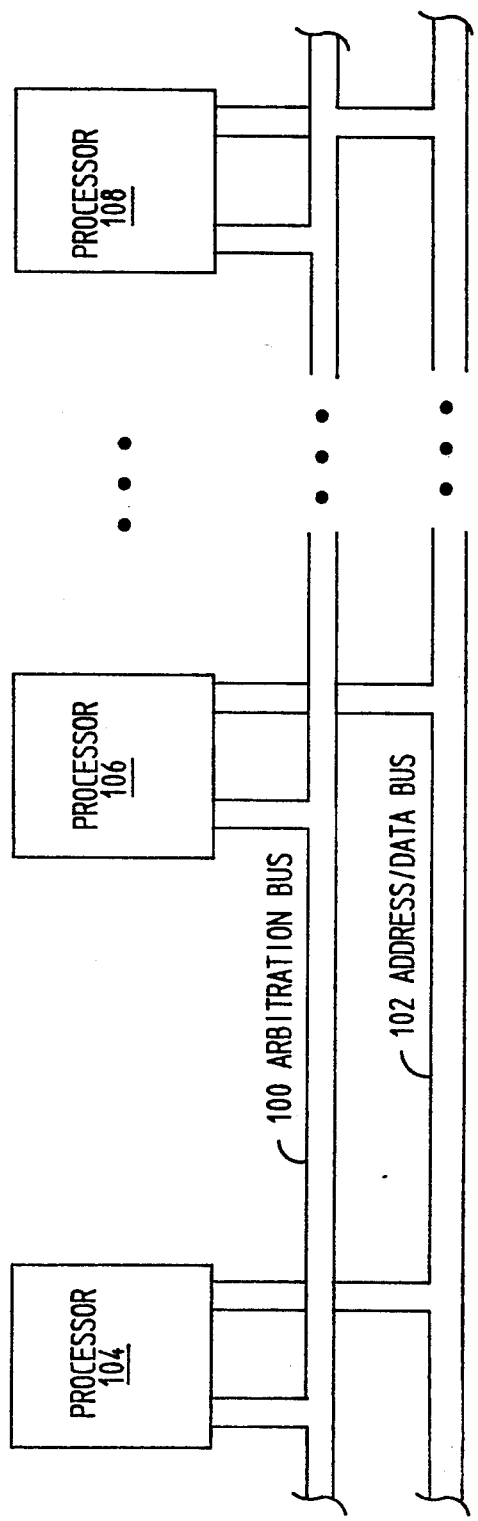
FIG. 1 is a block diagram of a computer bus system with multiple processors, a shared address/data bus, and a separate arbitration bus.

FIG. 1 illustrates a computer system with a shared address/data bus 102 and multiple processors (104, 106 and 108). In FIG. 1, the signal lines associated with arbitration are depicted as a separate arbitration bus 100. In the present application, "processor" means any device which contains the arbitration system described below and which is connected to the arbitration bus 100. That is, the invention could also include memory devices and peripheral devices or any other devices capable of using arbitration bus 100 to arbitrate for access to the address/data bus 102.

FIG. 2A illustrates additional arbitration signal detail for one processor 200 (FIG. 1, 102, 106 or 108). As illustrated in FIG. 2A, for the present invention, if there are N processors in the system, each processor has one outgoing (unidirectional) arbitration signal 202 and N−1 incoming (unidirectional) arbitration signals 204.

FIG. 2B illustrates the arbitration signal detail of FIG. 2A with a three (N=3) processor system. In FIG. 2B, processor 210 has a single outgoing signal 220, processor 211 has a single outgoing signal 221, and processor 212 has a single outgoing signal 222. Each outgoing signal (220, 221 and 222) is a incoming signal to each other processor. Each processor has two (N−1) incoming signals. As will be shown below, the present invention extracts more functions from these N wires than prior art N-wire systems.

Figure 3:
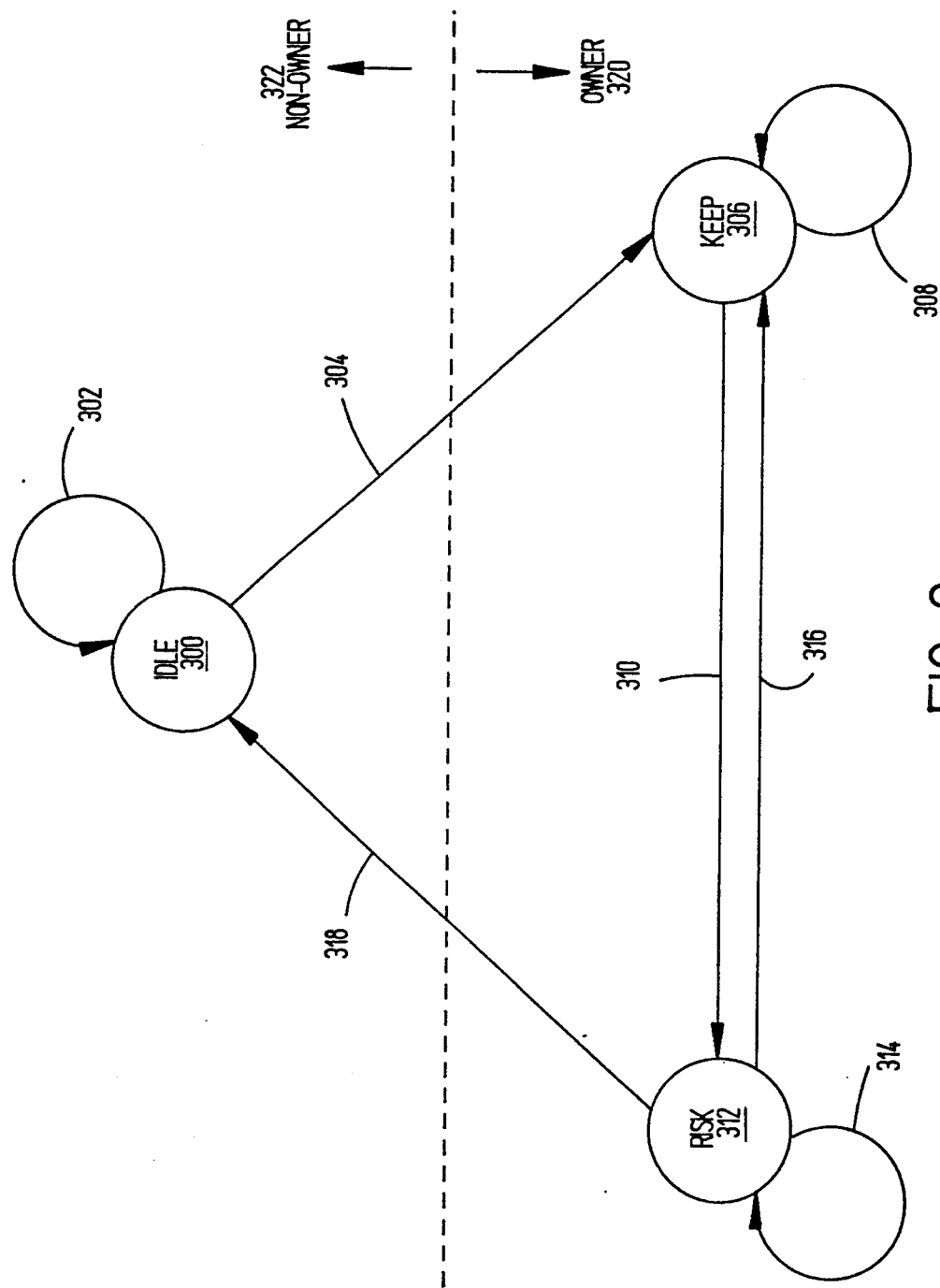
FIG. 3 is a state diagram illustrating the possible arbitration states for the present invention.

FIG. 3 illustrates a state diagram for an arbitration state machine for the present invention. In the preferred embodiment of the present invention, each processor attached to the arbitration bus (FIG. 1, 100) contains an arbitration state machine as illustrated by FIG. 3. All processors except one must be in the IDLE state 300. These processors cycle in the IDLE state 300 (path 302) until granted control (path 304) of the address/data bus (FIG. 1, 102) by a process described below. At any given time, exactly one processor is designated the arbitration bus owner 320. The arbitration bus owner 320 must be in a KEEP state 306 or a RISK state 312. When a processor is in active control of the address/data bus (FIG. 1, 102), it is in the KEEP state 306. As described in the background section, some transactions require a response by another processor. As will be explained below, in the present invention, if a first processor initiates a transaction requiring a response by a second processor, the first processor remains in the KEEP state 306 even when the second processor is responding on the address/data bus (FIG. 1, 102).

When a transaction is complete, the arbitration bus owner transfers from the KEEP state 306 via path 310 to the RISK state 312. Recall from the background section that one design goal is to efficiently accommodate burst transactions. As illustrated in FIG. 3, in the present invention, an arbitration bus owner does not automatically relinquish ownership. Instead, it remains the default owner 320 in the RISK state 312. If no other processor is requesting access during the RISK state 312, the owner 320 can automatically return via path 316 to the KEEP state 306 without further arbitration. Alternatively, if one or more processors and the arbitration bus owner simultaneously request access during the RISK state, the current arbitration bus owner 320 is granted access. As will be illustrated later with FIGS. 6 and 9, other processors must request access before the arbitration bus owner returns to the risk state in order to interrupt a burst of transactions. This automatic access increases the speed of burst transactions relative to methods which require an arbitration process for every access. If an arbitration bus owner in the RISK state 312 does not need to access the address/data bus (FIG. 1, 102), it will remain in the RISK state 312 via path 314 until it needs access or until some other processor requests access.

Figure 4:
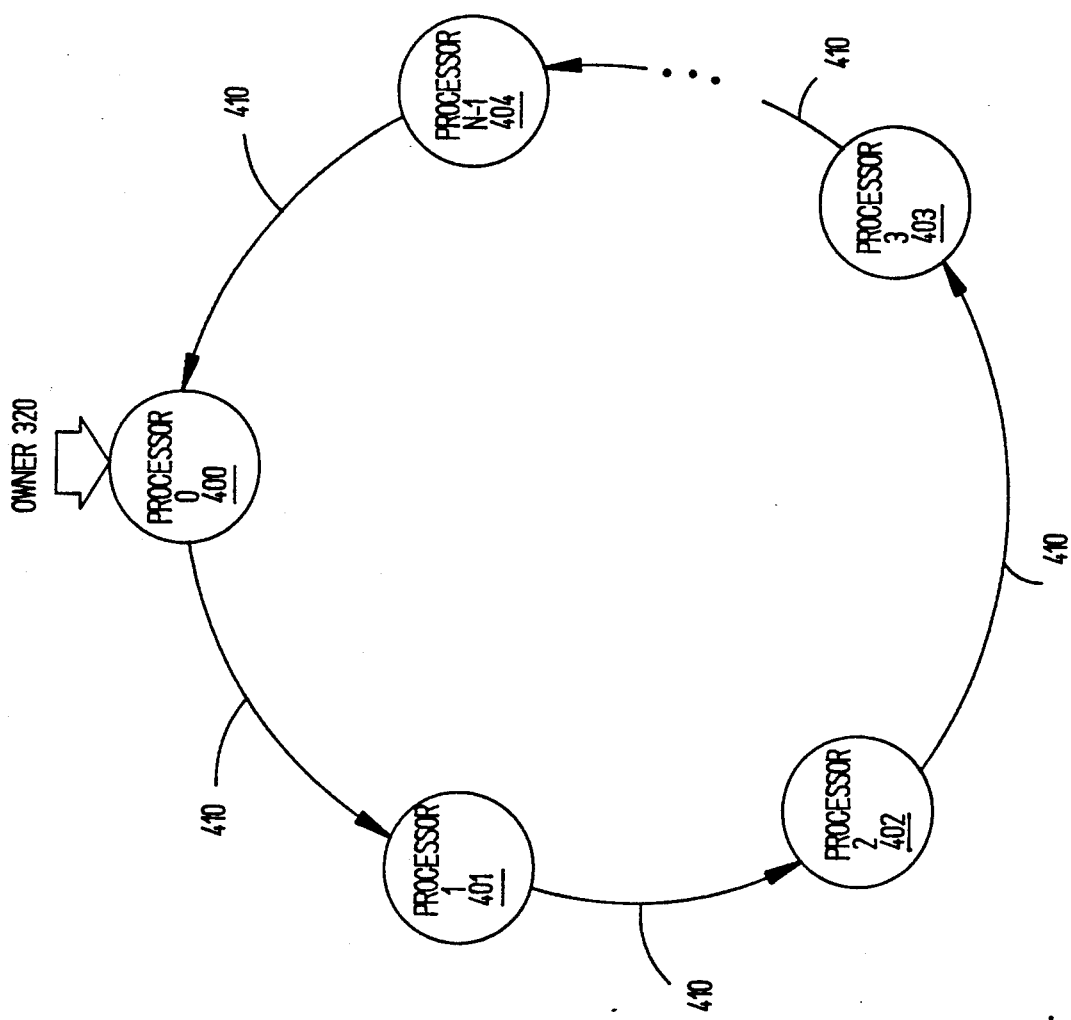
FIG. 4 is a block diagram illustrating the circular priority control register for the present invention.

FIG. 4 illustrates a circular register or state machine which determines processor arbitration priority in the arbitration protocol for the present invention. In the preferred embodiment of the present invention, each processor attached to the arbitration bus (FIG. 1, 100) contains a circular register or state machine as illustrated by FIG. 4 and all such registers or state machines have identical states at all times. As depicted in FIG. 4, N processors (0–N−1) are represented by N bit positions (400-404) in a circular register. One processor is the arbitration bus owner 320 (also FIG. 3, 320) as defined by a single logical "ONE" bit in the circular register. The register shifts the logical "ONE" in the direction depicted by the arrows 410. When the arbitration state machine is in the RISK state (FIG. 3, 312), and one or more processors other than the arbitration bus owner request access, the register shifts without state delay in the direction of arrows 410 until reaching a requesting processor. Arbitration bus ownership is granted to the next processor in the direction of arrows 410 which is requesting access. During power-up initialization, processor 0 (400) is arbitrarily assigned initial arbitration bus ownership (FIG. 3, KEEP state 306).

Figure 5:
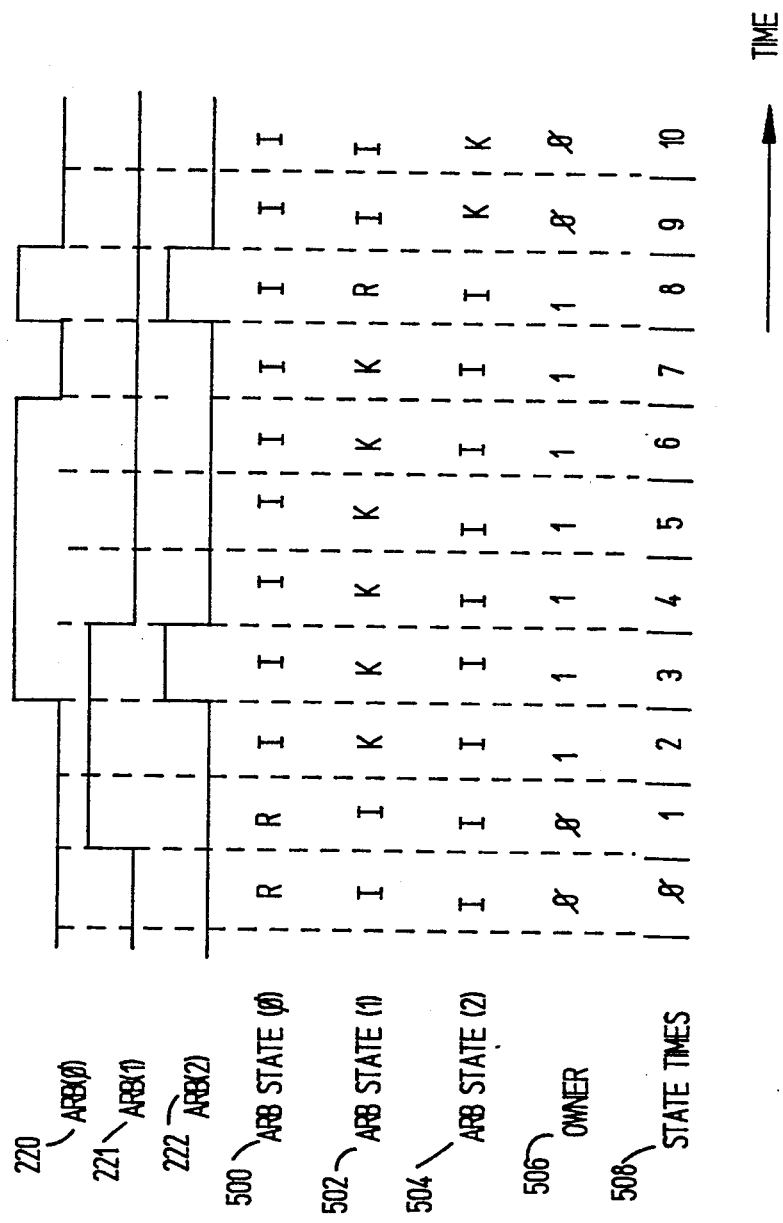
FIG. 5 is a timing diagram illustrating timing for cache-coherent arbitration transaction examples.
Figure 6:
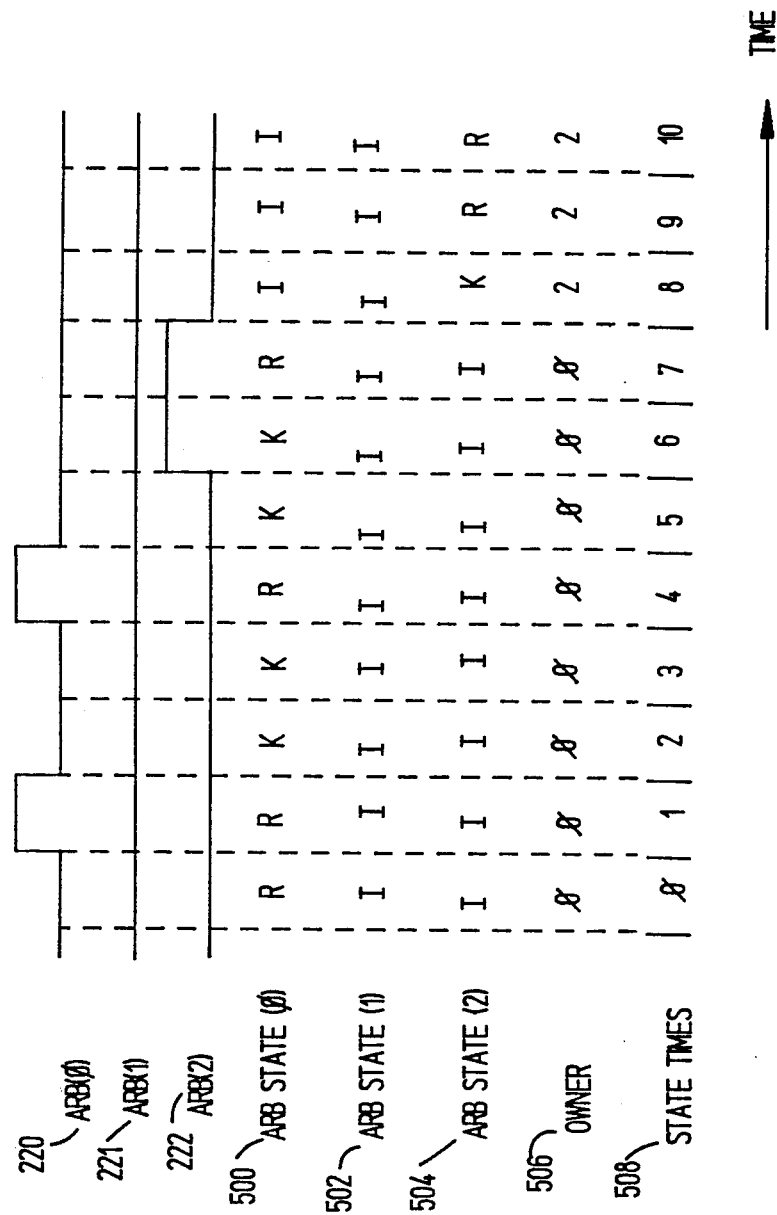
FIG. 6 is a timing diagram illustrating timing for non-cache-coherent arbitration transaction examples.

As will be further illustrated in FIGS. 5 and 6, a request for access by a processor other than the arbitration bus owner will prohibit the arbitration bus owner from immediately arbitrating again, thereby ensuring fair arbitration. In the worst case, if all N processors are requesting access, one processor must wait for N−1 transactions before gaining arbitration bus ownership. In the best case, if only one processor is requesting access, that processor automatically remains the arbitration bus owner without further arbitration until another processor requests access. Therefore, a burst of transactions can occur at maximum speed but can also be interrupted if another processor requests access.

FIGS. 5 and 6 are timing diagrams illustrating additional detail of the arbitration process for the present invention. For the purpose of example, FIGS. 5 and 6 assume three processors 210, 211 and 212 as illustrated in FIG. 2B. In FIGS. 5 and 6, signals ARB(0) 220, ARB(1) 221 and ARB(2) 222 are as illustrated in FIG. 2B. ARB STATE(0) 500, ARB STATE(1) 502 and ARB STATE(2) 504 represent the arbitration state (IDLE (I), KEEP (K) or RISK (R)) as illustrated in FIG. 3, for processors 210, 211 and 212 respectively. Owner 506 indicates which processor (abbreviated as 0 for processor 210, 1 for processor 211 and 2 for processor 212) is the arbitration bus owner as illustrated in FIGS. 3 and 4 (320). State times 508 illustrate sequential increments of time in units of bus state times.

In the preferred embodiment of the present invention, transactions involving cache memory (cache-coherent transactions) are fundamentally different than transactions which do not involve cache memory (non-cache-coherent transactions). Each processor on the address/data bus (FIG. 1, 102) monitors all address/data bus transactions. Transactions with certain operation codes are automatically recognized as cache-coherent transactions. That is, a cache-coherent transaction is determined by information on the address/data bus 102 and not on signals on the arbitration bus 100. FIG. 5 illustrates timing examples for cache-coherent transactions. FIG. 6 illustrates timing examples for non-cache coherent transactions.

FIG. 5 illustrates timing for cache coherent transactions, and also the method used to provide for an automatic response. In FIG. 5, at state time 0, processor 210 is the arbitration bus owner (ARB STATE(0) is RISK) but is not requesting access to the address/data bus. At state time 1, processor 211 requests access to the address/data bus by asserting ARB(1) and access is granted. At state time 2, processor 211 is the arbitration bus owner (ARB STATE(1) is KEEP). As described in the background section above, in general, a transaction by one processor may require cache memory activity by other processors in order to maintain cache coherency. In FIG. 5, at state time 3, processor 210 drives signal ARB(0) 220 high and processor 212 drives signal ARB(2) 222 high. These provide "busy" signals. The cache-coherent transaction initiated by processor 211 at state time 1 is not complete until the last busy signal is removed.

Another design goal of the present invention is to efficiently accommodate automatic responses. In the present invention, at most one processor can respond to a transaction. That responding processor gains control by being the last processor to remove a busy signal. For example, in FIG. 5 at state time 4, only processor 210 is still asserting a busy signal (ARB(0) 220). If processor 210 needs access to the address/data bus (FIG. 1, 102) in order to respond to processor 211, processor 210 can automatically access the address/data bus 102, without arbitration, during the period when it is the only processor asserting its ARB() signal (state times 4-7). At state times 4-7, processor 210 (and only processor 210) may actively drive the address/data bus 102 even though processor 211 is still the arbitration bus owner (ARB STATE(1) is KEEP) and even though processor 210 is in the IDLE state (ARB STATE(0) is IDLE).

Continuing with FIG. 5, at state time 7, the transaction initiated by processor 211 at state time 1 is completed. At state time 8, processor 211 reverts to the RISK state (FIG. 3, 316). For a cache-coherent transaction, processor 211 is prohibited from arbitrating during this first state after a completed transaction. This prohibition provides a window of opportunity for another processor to request access if desired.

Continuing with FIG. 5, both processors 210 and 212 simultaneously request access during state time 8 (ARB(0)=TRUE, ARB(2)=TRUE). The arbitration bus owner at state time 8 is still processor 211 (ARB STATE(1)=RISK). From the direction of the arrows (410) in FIG. 4, the circular priority for the three processors in FIG. 2B and FIG. 5 cycles from processor 211 to processor 212 to processor 210 and back to processor 211. Therefore, after processor 211 is the arbitration bus owner, processor 212 is next in the circular priority register and processor 212 becomes the new arbitration bus owner during state time 9 (ARB STATE(2)=KEEP).

FIG. 6 illustrates timing diagram examples for a burst of non-cache-coherent transactions. In FIG. 6, at state time 0, processor 210 is the arbitration bus owner. At state time 1, processor 210 requests access and access is granted. At state times 2 and 3, processor 210 is still in the KEEP state, even though ARB(0) is low. For a non-cache-coherent transaction, whether the arbitration bus owner is still busy is determined by signal activity on the address/data bus and not on the state of the ARB() line of the arbitration bus owner. At state time 4, the initial transaction is complete and the arbitration state of processor 210 reverts to RISK. As discussed with FIG. 5, if the transaction initiated at state time 1 had been a cache-coherent transaction, then processor 210 would be prohibited from arbitration during state time 4. However, for non-cache-coherent transactions, if no other processors request access during the previous transaction (state times 1-3 in FIG. 6), the arbitration bus owner can immediately initiate another transaction, as illustrated at state time 4 in FIG. 6.

Continuing with FIG. 6, at state time 6, while processor 210 is still in the KEEP state, processor 212 asserts ARB(2). Since this is a non-cache-coherent transaction, this is interpreted as a request for access rather than as a busy signal. Therefore, when the transaction initiated by processor 210 at state time 4 is complete at state time 7, processor 210 is prohibited from automatic access. Arbitration bus ownership then passes at state time 8 to processor 212 and the burst of transactions by processor 210 is interrupted.

Figure 7:
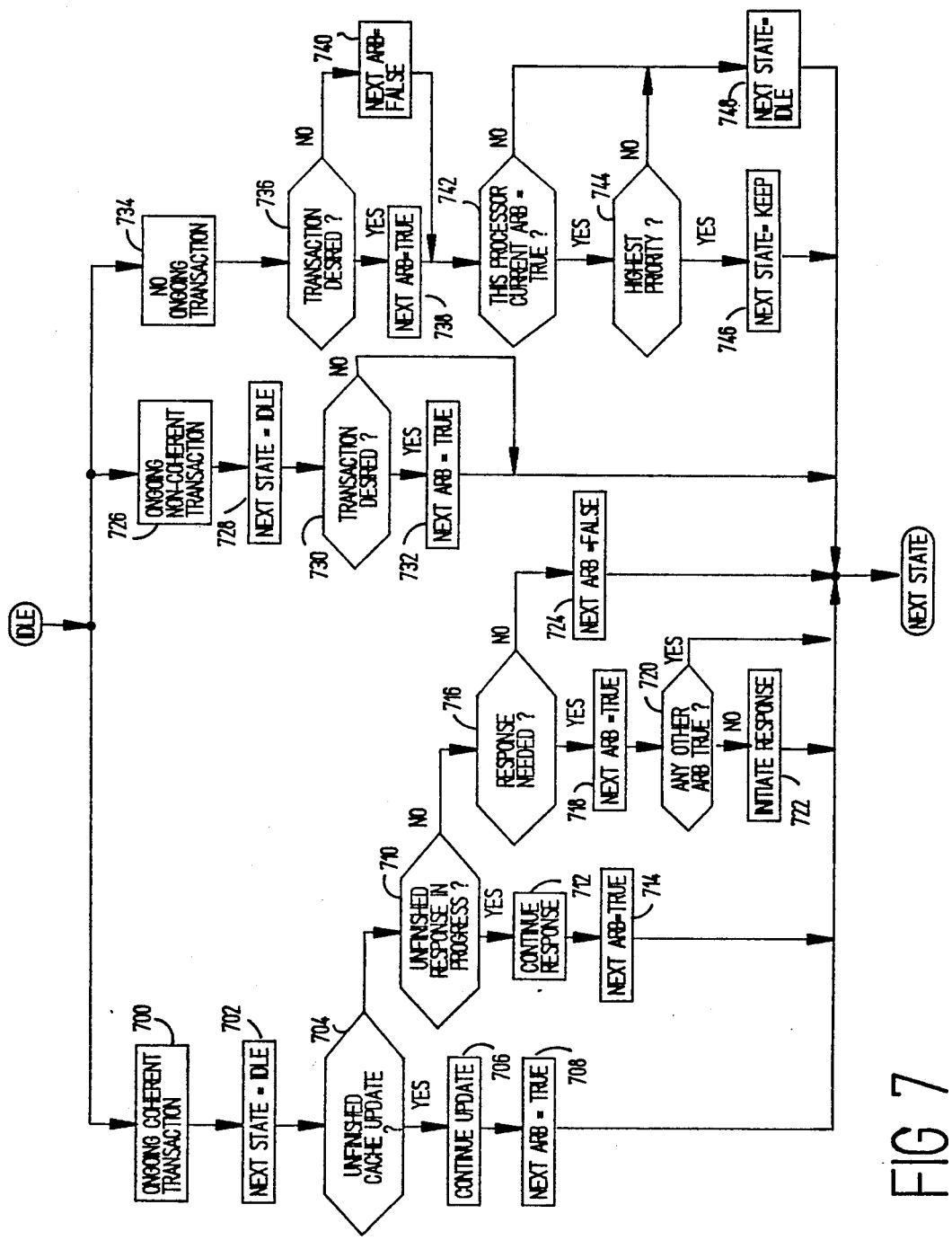
FIG. 7 is a flow chart of arbitration bus state transitions and arbitration signal transitions for a processor in the IDLE state.
Figure 8:
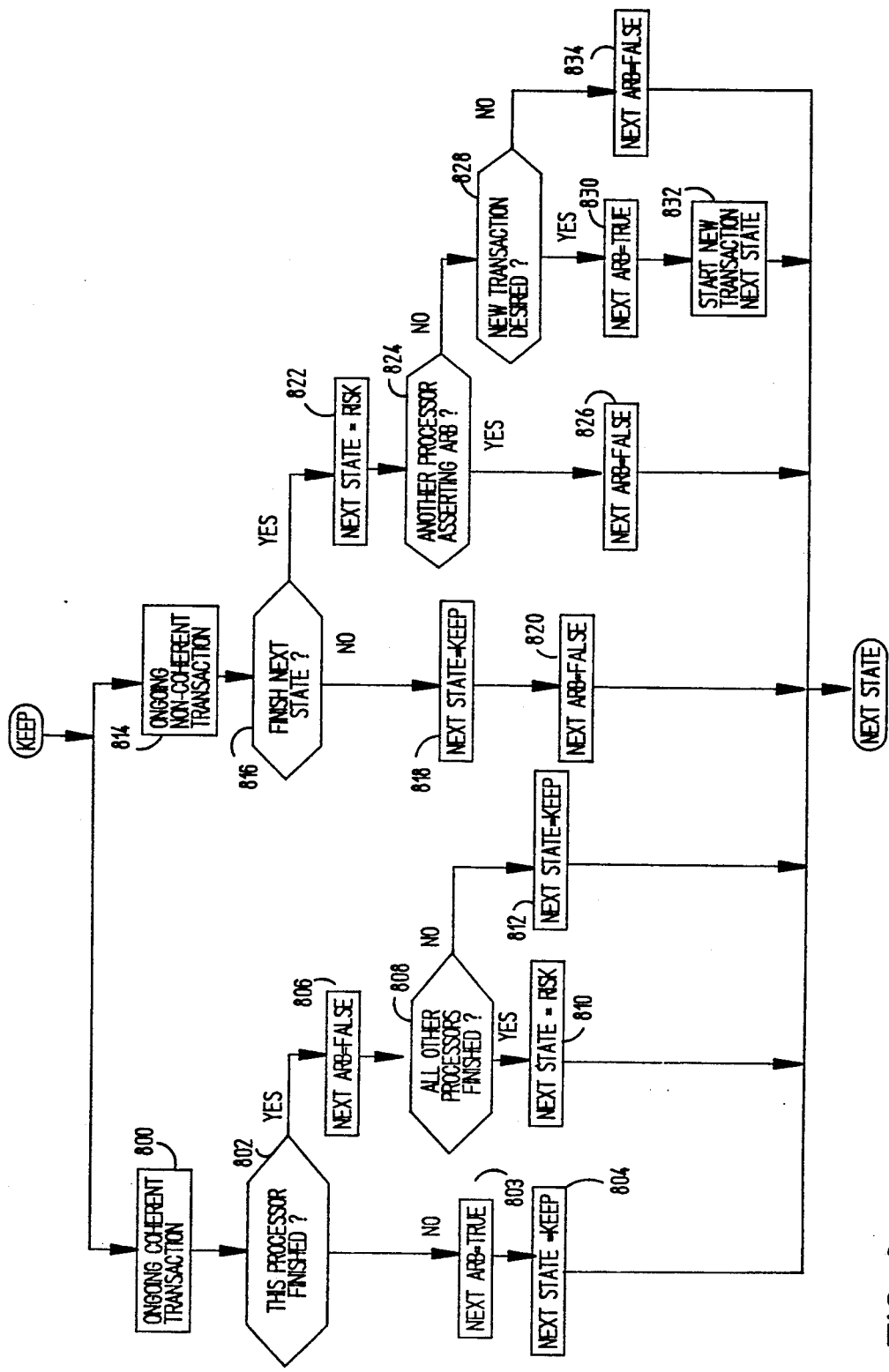
FIG. 8 is a flow chart of arbitration bus state transitions and arbitration signal transitions for a processor in the KEEP state.
Figure 9:
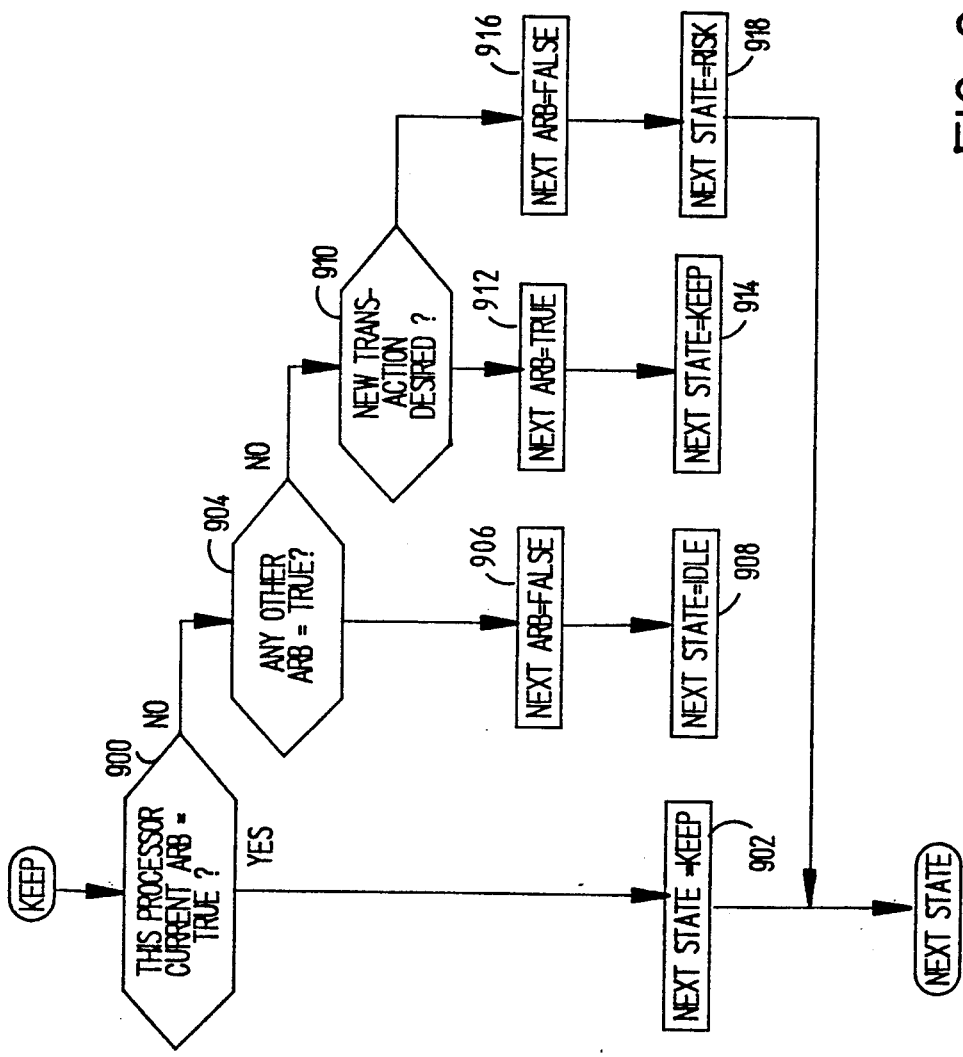
FIG. 9 is a flow chart of arbitration bus state transitions and arbitration signal transitions for a processor in the RISK state.

FIGS. 5 and 6 illustrate only a few of the many combinations of arbitration, transactions and state transitions. A complete description of all possible arbitration bus states and state transitions is provided in flow chart form in FIGS. 7-9. As illustrated in FIGS. 7-9, for each arbitration bus state time, each processor must determine for the next state time whether it will assert (drive TRUE) or deassert (drive FALSE) its arbitration line, and what arbitration state it will be in during the next state time.

FIG. 7 illustrates a flow chart of the logic which determines the next arbitration signal (FIG. 2B, 220, 221, 222) and the next arbitration bus state (FIG. 3) for a processor in the IDLE state. A processor in the IDLE state must first determine whether there is a current ongoing transaction by another processor. Coherent versus non-coherent transactions are determined by monitoring transaction op-codes on the address/data bus (FIG. 1, 102). If any processor is still asserting its arbitration line after a coherent transaction is initiated, the coherent transaction is still ongoing (FIG. 7, 700). Whether non-coherent transactions are ongoing (FIG. 7, 726) is determined by activity on the address/data bus. If there are no ongoing transactions, a processor in the IDLE state follows the logic path indicated by FIG. 7, box 734.

As illustrated in FIG. 7, for a processor in the IDLE state, the next state is IDLE (702, 728, 748) unless the processor arbitrates for and is granted access to the address/data bus (path starting at box 734 and ending at box 746).

Continuing with FIG. 7, if the processor in the IDLE state is still in the process of updating its own cache (706), it will hold its ARB() line TRUE (708) until finished. If the processor in the IDLE state is actively responding to a coherent transaction initiated by another processor (712), it will hold its ARB() line TRUE (714) until finished. If no response to a coherent transaction is in process but a response is needed by the processor in the IDLE state, the processor will assert its ARB() line (718). If any other ARB() line is asserted (720), the processor must wait until it is the last processor asserting ARB() before initiating a response (722). If cache is not being updated and if no response is in process or needed, the next state of the ARB() line is FALSE (724).

Continuing with FIG. 7, if there is an ongoing non-coherent transaction by another processor (726), and the processor in the IDLE state desires to initiate a transaction, the next state of its ARB() line will be TRUE (732). If there are no ongoing transactions (734), and the processor in the IDLE state desires to initiate a transaction, the next state of its ARB() line will be TRUE (738). If there are no ongoing transactions (734), and the processor in the IDLE state asserted its ARB() line earlier so that it is TRUE in the present state (742), it is actively arbitrating and must compare its priority relative to other arbitrating processors (744). If it is actively arbitrating (744) and has the highest priority, it accesses the address/data bus the next state (746). Otherwise, it remains in the IDLE state (748).

FIG. 8 illustrates a flow chart of the logic which determines the next arbitration signal (FIG. 2B, 220, 221, 222) and the next arbitration bus state (FIG. 3) for a processor in the KEEP state. If the processor in the KEEP state has an ongoing coherent transaction which is not finished (802), it continues to assert its ARB() line to indicate busy (803) and it keeps the address/data bus for another state (804). If there is an ongoing coherent transaction which is finished by the processor in the KEEP state, its next ARB() state will be FALSE (806). Recall that a processor executing a coherent transaction is prohibited from arbitrating during the first state time after completion of the transaction. If other processors are still active (other processors asserting ARB() lines), the processor in the KEEP state will remain in the KEEP state (812). If the processor in the KEEP state is finished and all other processors are finished, the processor makes a transition to the RISK state at the next state time (810).

Continuing with FIG. 8, if a processor in the KEEP state has an ongoing non-coherent transaction (814) which will not be finished the next state, it will remain in the KEEP state (818). If the non-coherent transaction will be finished the next state, the next state will be RISK (822). If another processor is requesting access, the processor currently in the KEEP state will relinquish ownership on the next state (826). If no other processor is requesting access and another transaction is desired (for example a burst of transactions), this processor can immediately initiate a new transaction on the next state (832). It transitions to the RISK state with its arbitration signal TRUE (830) to indicate to other processors that a new transaction is starting. If finished, the processor transitions to the RISK state with its arbitration signal at FALSE (834).

FIG. 9 illustrates a flow chart of the logic which determines the next arbitration signal (FIG. 2B, 220, 221, 222) and the next arbitration bus state (FIG. 3) for a processor in the RISK state. Recall that a processor in the RISK state is still the bus owner. If a processor in the RISK state asserts its ARB() signal, it has highest priority and automatically gains access to the bus (902). If the processor in the RISK state does not assert its ARB() signal, any other processor requests for access will cause the processor in the RISK state to relinquish ownership and transition to the IDLE state (908). If no other processor is requesting access and the processor in the RISK state desires access, it asserts its ARB() signal (912) and transitions to the KEEP state (914). Otherwise, a processor in the RISK state remains in the RISK state (918).

In summary, as described above, for N processors, N ARB() signal lines provide arbitration identification, variable length transaction busy signals, responding processor identification, fair arbitration, and efficient burst transactions. In addition, the N ARB() signal lines are unidirectional for maximum speed.

The preferred implementation of the present invention utilizes the rotating priority method illustrated in FIG. 4 for fair arbitration. However, the inventive use of N signal conductors to provide arbitration request identification, variable transaction time busy signals, response identification and efficient burst transactions is independent of the particular arbitration method. Other arbitration schemes such as fixed priority would also work with the present invention.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a computer system having a plurality of processors interconnected by a bus, wherein each processor drives exactly one associated arbitration signal line connected to all processors, and wherein one of the processors has initiated a variable length transaction on the bus, a method for signaling the completion of the variable length transaction, the method comprising:

A. driving its associated arbitration signal line to logical TRUE by each processor which is busy implementing the transaction;
   B. driving its associated arbitration signal line to logical FALSE by each processor which is not busy implementing the transaction;
   C. detecting the logical state of all arbitration signal lines by the processor which initiated the transaction; and
   D. detecting that the transaction is complete, by the processor which initiated the transaction, solely by detecting when all arbitration signal lines are being driven to logical FALSE.

2. In a computer system having a plurality of processors interconnected by a bus, wherein each processor drives exactly one associated arbitration signal line connected to all processors, and wherein one of the processors has initiated a variable length transaction on the bus, a method for automatically granting bus access to one responding processor, the method comprising:

A. driving its associated arbitration signal line to logical TRUE by each processor which is busy implementing the transaction;
B. driving its associated arbitration signal line to logical FALSE by each processor which is not busy implementing the transaction;
C. detecting the logical state of all arbitration signal lines by the responding processor; and
D. driving the bus by the responding processor automatically when its associated arbitration line is the only arbitration signal line at logical TRUE.

3. A method as in claim 2 further providing a method for signaling the completion of the variable length transaction, the additional steps comprising:
E. detecting the logical state of all arbitration signal lines by the processor which initiated the transaction; and
F. detecting that the transaction is complete, by the processor which initiated the transaction, solely by detecting when all arbitration signal lines are being driven to logical FALSE.

4. In a computer system having a plurality of processors interconnected by a bus, wherein each processor drives exactly one associated arbitration signal line connected to all processors, and wherein one of the processors has initiated a burst transaction on the bus, a method for automatically granting continued bus access to the processor which initiated the burst transaction, the method comprising:
A. driving its associated arbitration signal line to logical TRUE by each processor requesting access to the bus;
B. driving its associated arbitration signal line to logical FALSE by each processor which is not requesting access to the bus;
C. detecting the logical state of all arbitration signal lines by the processor which initiated the burst transaction;
D. maintaining access to the bus and automatically initiating a new transaction by the processor which initiated the burst transaction if a new transaction is desired by the processor which initiated the burst transaction and if al arbitration signal lines are at logical FALSE during a last state of the transaction; and
E. releasing access to the bus by the processor which initiated the burst transaction if an arbitration signal line other than the arbitration signal line associated with the processor which initiated the burst transaction is at logical TRUE during the last state of the transaction.

5. In a computer system having a plurality of processors interconnected by a bus, wherein one of the processors has initiated a variable length transaction on the bus, a system for signaling the completion of the variable length transaction, the system comprising:
a plurality of arbitration signal lines having a one to one association with the plurality of processors, each arbitration signal line being driven only by its associated processor, and each arbitration signal line connected as an input to every processor other than its associated processor;
means for driving its associated arbitration signal line to logical TRUE by each processor which is busy implementing the transaction;
means for driving its associated arbitration signal line to logical FALSE by each processor which is not busy implementing the transaction;
means for detecting the logical state of all arbitration signal lines by the processor which initiated the transaction; and
means for detecting the completion of the transaction, by the processor which initiated the transaction, solely by detecting when all arbitration signal lines are being driven to logical FALSE.

6. In a computer system having a plurality of processors interconnected by a bus, wherein one of the processors has initiated a variable length transaction on the bus, a system for automatically granting bus access to one responding processor, the system comprising:
a plurality of arbitration signal lines having a one to one association with the plurality of processors, each arbitration signal line being driven only by its associated processor, and each arbitration signal line connected as an input to every processor other than its associated processor;
means for driving its associated arbitration signal line to logical TRUE by each processor which is busy implementing the transaction;
means for driving its associated arbitration signal line to logical FALSE by each processor which is not busy implementing the transaction;
means for detecting the logical state of all arbitration signal lines by the responding processor; and
means for automatically driving the bus by the responding processor when the arbitration line associated with the responding processor is the only arbitration signal line at logical TRUE.

7. A computer system as in claim 6 further comprising:
means for detecting the logical state of all arbitration signal lines by the processor which initiated the transaction; and
means for detecting completion of the transaction, by the processor which initiated the transaction, solely by detecting when all arbitration signal lines are being driven to logical FALSE.

8. In a computer system having a plurality of processors interconnected by a bus, wherein one of the processors has initiated a burst transaction on the bus, a system for automatically granting continued bus access to the processor which initiated the burst transaction, the system comprising:
a plurality of arbitration signal lines having a one to one association with the plurality of processors, each arbitration signal line being driven only by its associated processor, and each arbitration signal line connected as an input to every processor other than its associated processor;
means for driving its associated arbitration signal line to logical TRUE by each processor requesting access to the bus;
means for driving its associated arbitration signal line to logical FALSE by each processor which is not requesting access to the bus;
means for detecting the logical state of all arbitration signal lines by processor which initiated the burst transaction;
means for maintaining access and automatically initiating a new transaction by the processor which initiated the burst transaction if a new transaction is desired by the processor which initiated the burst transaction and if all arbitration signal lines are at logical FALSE during a last state of the transaction; and
means for releasing access to the bus by the processor which initiated the burst transaction if an arbitration signal line other than the arbitration signal line associated with the processor which initiated the burst transaction is at logical TRUE during the last state of the transaction.

* * * * *